United States Patent
Cole et al.

(10) Patent No.: US 6,354,736 B1
(45) Date of Patent: Mar. 12, 2002

(54) WIDE TEMPERATURE RANGE RTD

(75) Inventors: Barrett E. Cole, Bloomington; Steven R. Weeres, Minneapolis; James O. Holmen, Minnetonka, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/275,288

(22) Filed: Mar. 24, 1999

(51) Int. Cl.$^7$ ............................... G01K 7/16; H01C 1/14
(52) U.S. Cl. ....................... 374/185; 374/183; 338/22 R
(58) Field of Search ................... 374/185, 183; 338/322 R

(56) References Cited

U.S. PATENT DOCUMENTS

| | | | |
|---|---|---|---|
| 3,647,662 A | * 3/1972 | Gerstenberg et al. | |
| 4,129,848 A | * 12/1978 | Frank et al. | 374/185 |
| 4,737,757 A | * 4/1988 | Senda et al. | 338/308 |
| 4,841,273 A | * 6/1989 | Horton | 338/28 |
| 4,951,028 A | * 8/1990 | Tuller | 374/185 |
| 5,053,740 A | * 10/1991 | Schultz et al. | 374/185 |
| 5,197,804 A | * 3/1993 | Tani et al. | 374/185 |
| 5,258,736 A | * 11/1993 | Kristen et al. | 374/185 |
| 5,372,427 A | * 12/1994 | Padovani et al. | 374/208 |
| 5,430,428 A | * 7/1995 | Gerbinger et al. | 374/185 |
| 5,735,606 A | * 4/1998 | Tani et al. | 374/185 |
| 5,823,680 A | * 10/1998 | Kato et al. | 374/183 |
| 5,966,086 A | * 10/1999 | Kubo et al. | 341/155 |
| 5,973,383 A | * 10/1999 | Cole et al. | 257/536 |
| 6,013,940 A | * 1/2000 | Harada et al. | 257/538 |
| 6,121,942 A | * 9/2000 | Sanou et al. | 345/75 |
| 6,179,785 B1 | * 1/2001 | Martinosky et al. | 600/549 |
| 6,210,494 B1 | * 4/2001 | Cole et al. | 148/237 |

FOREIGN PATENT DOCUMENTS

JP          03035502      * 2/1991

OTHER PUBLICATIONS

J.M. Molarium, A.S. Koshoner, V.K. Lindroos. A Study of nigrogen–rich titanium and zirconium nitride film. *Journal of Vacuum Science and Technology*: A5(4) Jul./Aug. 1987, pp. 2184–2189.

S. Miyagawa, M. Ikeyama, K. Saitoh, S. Nakao, H. Niwa, S. Tauenura, Y. Miyagawa. Thermal behaviour of nitrogen implanted into zirconium. *Surface & Coating Technology*: 66 (1994), pp. 245–249.

D.S. Yee, J.J. Cuomo, M.A. Frisch, D.P.E. Smith. Reactive radio frequency sputter deposition of higher nitrides of titanium, zirconium, and hafnium. *Journal of Vacuum Science and Technology*: A4(3) May/Jun. 1986, pp. 381–387.

Jih–Fen Lei, H. Okimura, John O. Brittain. The Electrical Resistance of the Group IV Transition Metal Monocarbides and Mononitrides in the Temperature Range 20–1000 °C. *Material Science & Engineering*: A123 (1990), pp. 129–140.

S. Berg, T. Larsson, H.O. Blom. The use of nitrogen flow as a deposition rate control in reactive sputtering. *Journal of Vacuum Science and Technology*: A4(3) May/Jun. 1986, pp. 594–597.

Tsutom Yotsuya, Masaaki Yoshitake, Yoshihiko Suzuki, Sonichi Ogawa. The Film Thermometer with Small Magnetoresistance. *Advances in Cryogenic Engineerings*: vol. 39 (1994), pp. 1027–1034.

* cited by examiner

Primary Examiner—Diego Gutierrez
Assistant Examiner—Gail Verbitsky
(74) Attorney, Agent, or Firm—John G. Shudy, Jr.

(57) ABSTRACT

An RTD having a thin film HfN resistor formed on a substrate for temperature detection in accordance with the resistance of the HfN resistor. The RTD is a two lead device having high accuracy and a wide temperature range from 20 to 1400 degrees Kelvin. The substrate has bonding pads or contact strips connected to the resistor and processing electronics. An SiN thin film passivation layer is formed on the resistor and substrate. Two leads connect the bonding pads or contact strips to processing electronics and an indicator.

22 Claims, 8 Drawing Sheets

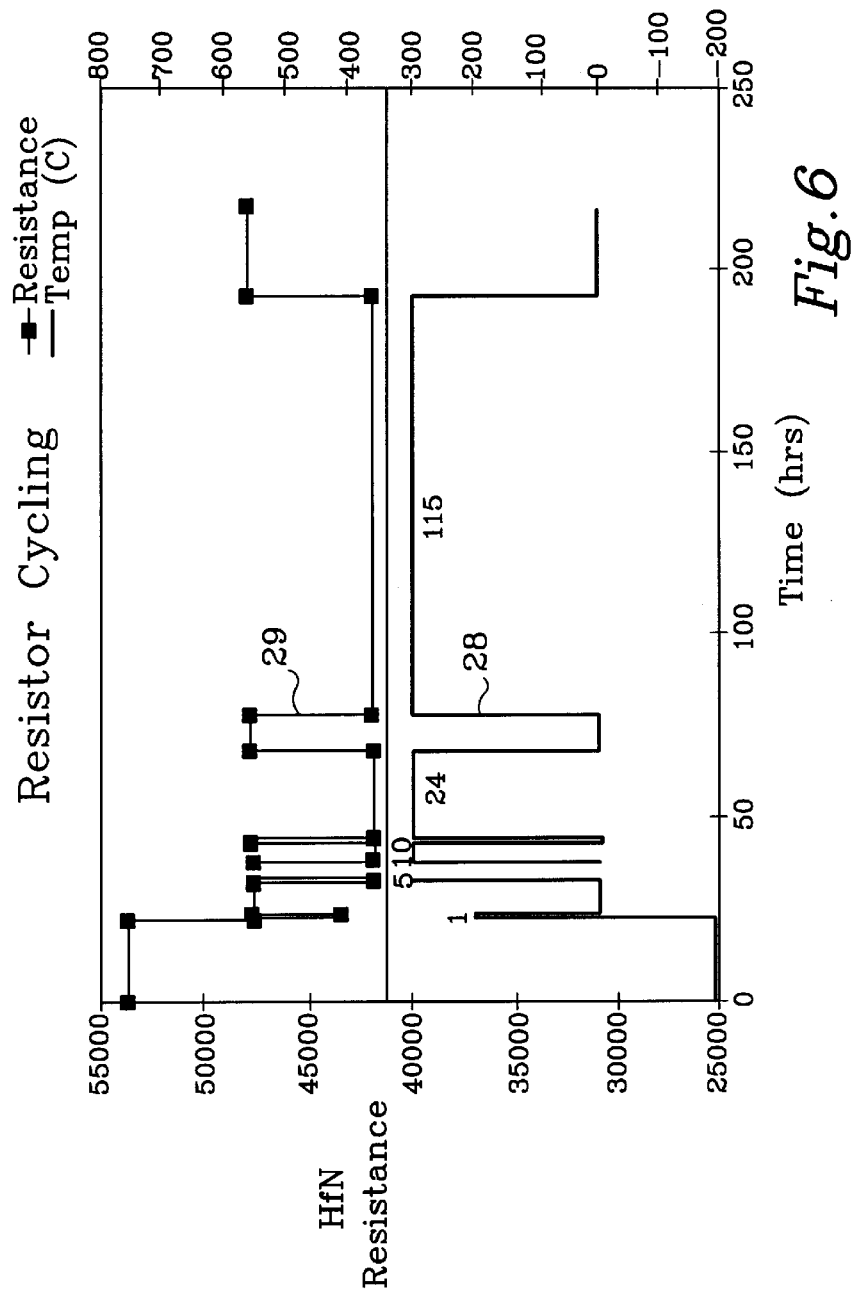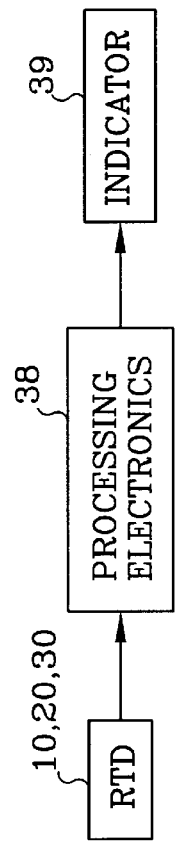

WIDE TEMPERATURE RANGE RTD

BACKGROUND

The present invention pertains to sensors and particularly to temperature sensors. More particularly, the invention pertains to resistance temperature devices.

Thermocouples produce small signals and require a cold junction for accurate temperature measurements. Thermocouples are unstable and require calibration. Thermistors have a limited range of temperature measurement because of a high temperature coefficient of resistance (TCR). Also, thermistors are not compatible with integrated circuitry. Related art resistance temperature devices (RTD's) typically are fabricated with platinum (Pt) metal wires or films. Several disadvantages of Pt RTD's are expensive Pt and low resistance. RTD's using metal conductor sensing elements have low base resistances, which are difficult to measure without heating the devices, and have different performance profiles at cold and hot temperatures.

SUMMARY OF THE INVENTION

The present invention is a RTD having a hafnium (Hf) nitride (N) sensing element. This RTD has a wide temperature operating range, has a simple temperature performance profile and is compatible with silicon processing and integrated circuitry. The present RTD may be passivated with merely a silicon nitride (SiN) film. The RTD is just a two-wire device in contrast to related-art RTD's that require three or four wires for useful measurements over a practical temperature range. The present RTD is quite manufacturable and commercially viable. This temperature sensor has application in thermal control and propulsion system monitoring of spacecraft, and for providing measurements of automotive and aircraft engines, brakes and emission control systems. The RTD also has cryogenic applications.

BRIEF DESCRIPTION OF THE DRAWING

FIG. 6 is a graph showing HfN resistor temperature cycling over time.

FIG. 7 is a schematic of an RTD and associated electronics.

DESCRIPTION OF THE EMBODIMENTS

Figure 1A:
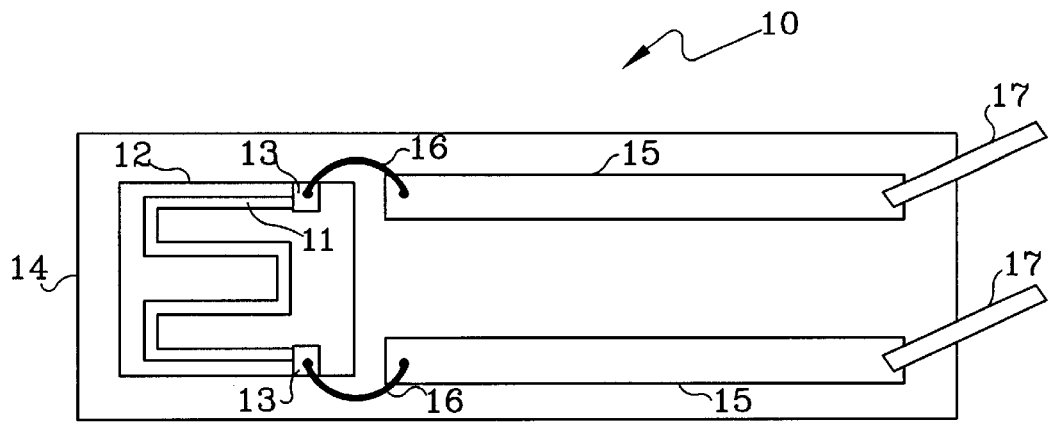
FIGS. 1a, 1b and 1c show several embodiments of an HfN RTD.

FIG. 1a shows a layout of an RTD 10. A thin film serpentine resistor 11 fabricated from HfN is deposited, grown or formed a silicon die 12. Resistor 11 is connected to bonding pads 13 deposited, grown or formed on die 12. Typical bonding pads 15 are made from titanium-platinum (TiPt)/gold (Au) films. Die 12 is formed or placed on substrate 14. Substrate 14 may be alumina ($Al_2O_3$), ceramic, glass or other like material.

Figure 1B:
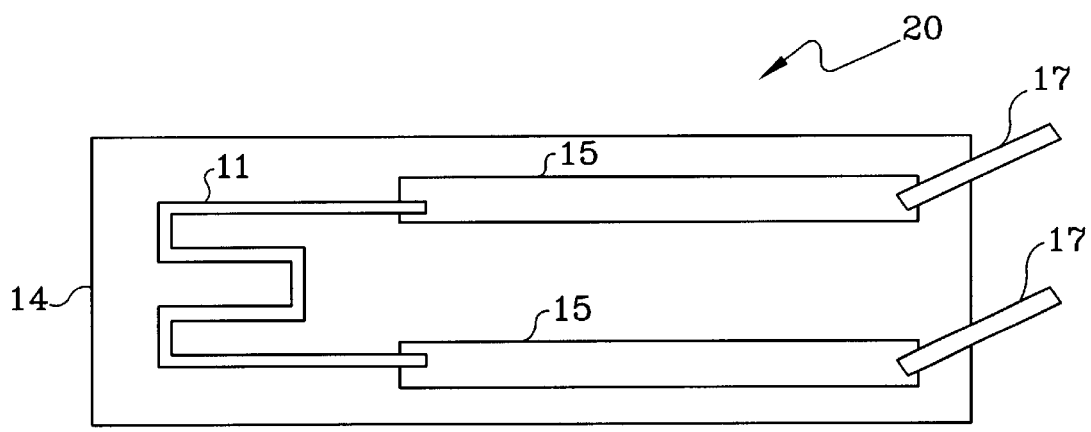
Figure 1C:
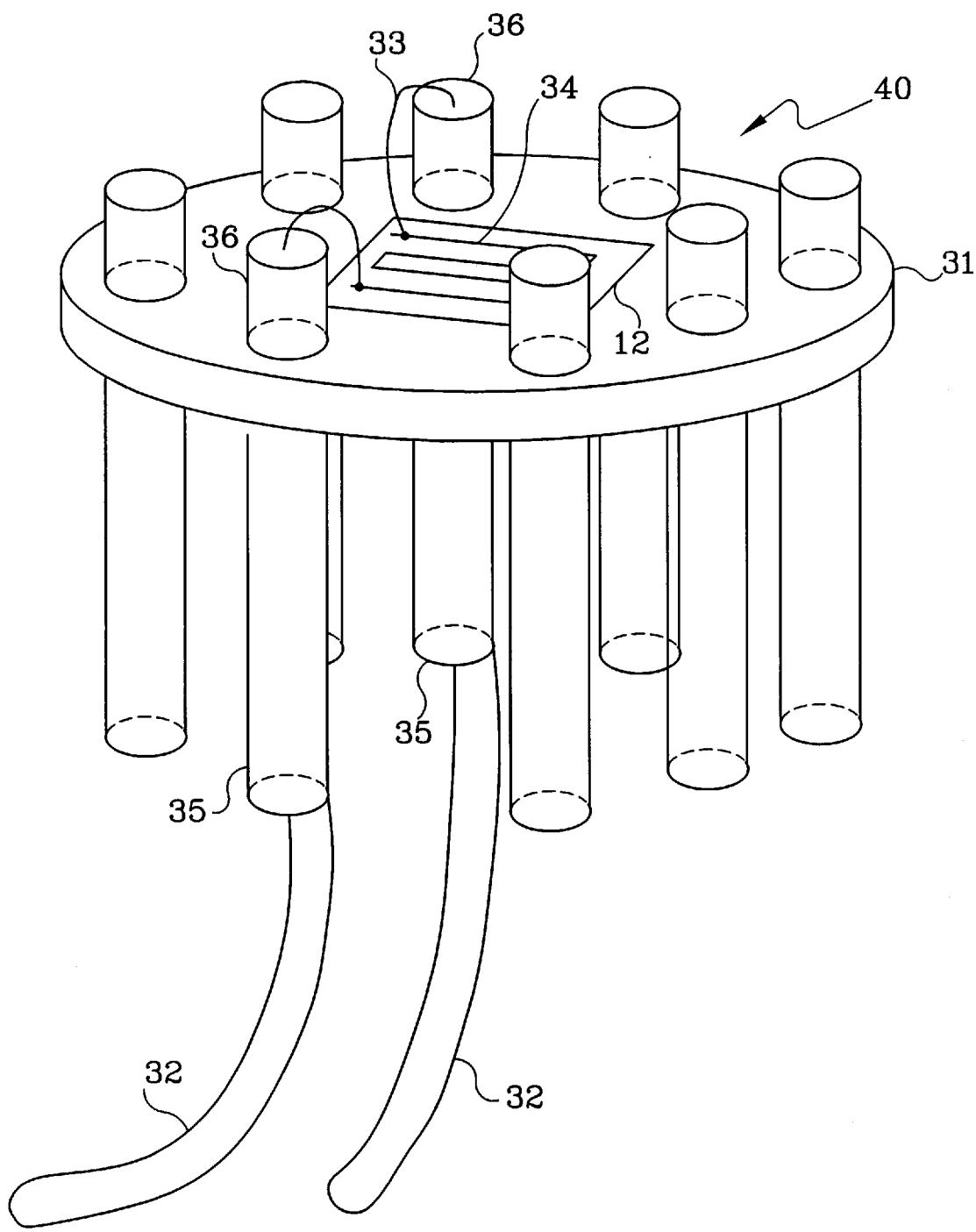

The substrate 12 may also be a mounted on a die header 31, in a configuration 40 shown in FIG. 1c, with the wire bond connections going from the chip pads to the header posts. Also, on substrate 14 are low resistance metal lines or contacts 15, which are composed of nickel-chromium (NiCr) metal but could also be composed of other metals such as Ni. Wires 16 bonded to pads 13 and metal lines or contacts 15 connect resistor 11 to strips 15. Wires 16 are typically gold but may also be aluminum or platinum. Leads or wires 17 are bonded to contacts, lines or strips 15 for providing connections of RTD 10 to the external devices. Leads or wires 17 may be composed of copper. In configuration 40 of FIG. 1c, chip 12 is mounted on a T08 header 31. The leads 32 are nickel wires spot-welded to the header leads 35. An HfN resistor 34 on the die is electrically attached to two header posts 36 with Au wires 33. The size and thickness of die 12 are about 0.5 millimeters (20 mils) thick and 3.2 millimeters (⅛ inch) square although smaller dies at 0.5 millimeter (mm) on a side are possible. The length and thickness of resistor 11 is about 50 nanometers (500 Angstroms) thick, 4 microns wide and 100 microns long. The bond pads 13 are about 0.1 mm (0.004 inch) in size. The sizes and thickness of strips 15 are about 25 to 50 microns wide and 0.25 to 2.5 mm long. The size and thickness of substrate 14 is about 3.2 mm thick and approximately 2.54 centimeters (cm) lateral dimension.

FIG. 1b shows a layout of RTD 20. Thin film serpentine resistor 11, having a composition of HfN, is deposited grown or otherwise formed on substrate 14. Substrate 14 may be made from alumina, ceramic, glass or other like material. Resistor 11 has its ends bonded or connected to low resistance metal pads, lines, strips or contacts 15. Leads or wires 17 are connected to contacts 15. Contacts 15 and wires 17 may be fabricated from similar materials as contacts 15 and wires 17 of RTD 10, respectively. Both substrates 14, or at least the portion of the substrate with resistor 11, may be covered and annealed with a passivation layer to seal resistor 11 from the ambient environment. An example of this passivation layer or thin film 18 is shown as a part of RTD 30 in FIG. 2. This layer 18 may be composed of silicon nitride (SiN). Passivation layer 18 makes RTD's 10, 20 and 30 more durable and robust for high temperature operation. A vacuum annealed HfN RTD results in excellent stability of accuracy over time.

Figure 2:
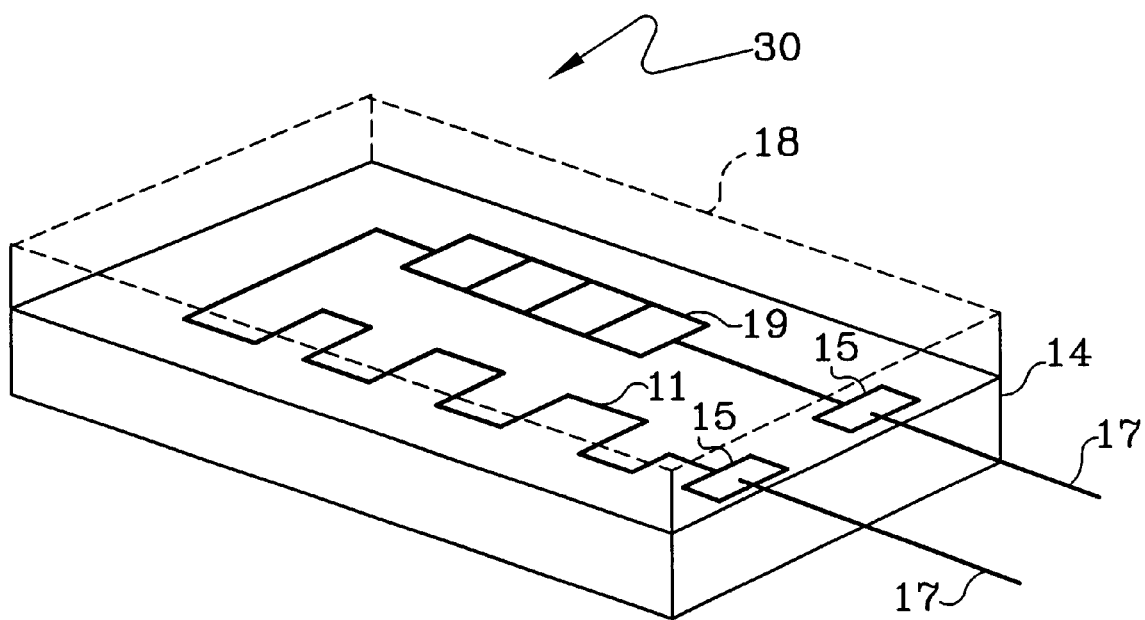
FIG. 2 shows another embodiment of an HfN RTD.

RTD 30 of FIG. 2 has a serpentine thin film HfN resistor formed on substrate 14, which may be composed of silicon, ceramic, glass, alumina or other like material. Also, connected in series with resistor 11 is a ladder resistor 19 also composed of HfN. Resistor 19 may be trimmed with a laser light by cutting one of the straight sections of resistor 19, to calibrate the total resistance of resistors 11 and 19. This high resolution trimming of base resistance of resistors 11 and 12 is a precision-attaining procedure and is accomplished before passivation layer 18 is deposited or formed on resistors 11 and 19. The open resistor 11 and resistor 19 ends are bonded or connected to a pad 15. To pad 15 are bonded or connected leads or wires 17.

The composition of HfN used for resistors 11 and 19 may be $HfN_x$, where x may be between 1.0 and 2.0. Rutherford backscattering measurements on similar films have shown that the ratio of nitrogen to Hf is on the order of 1.25. The HfN is better characterized by its resistance in resistor 11 rather than the composition ratio of the material. Also, the configuration of resistor 11 need not be only of a serpentine fashion. Likewise, resistor 19 may have another configuration.

Figure 3:
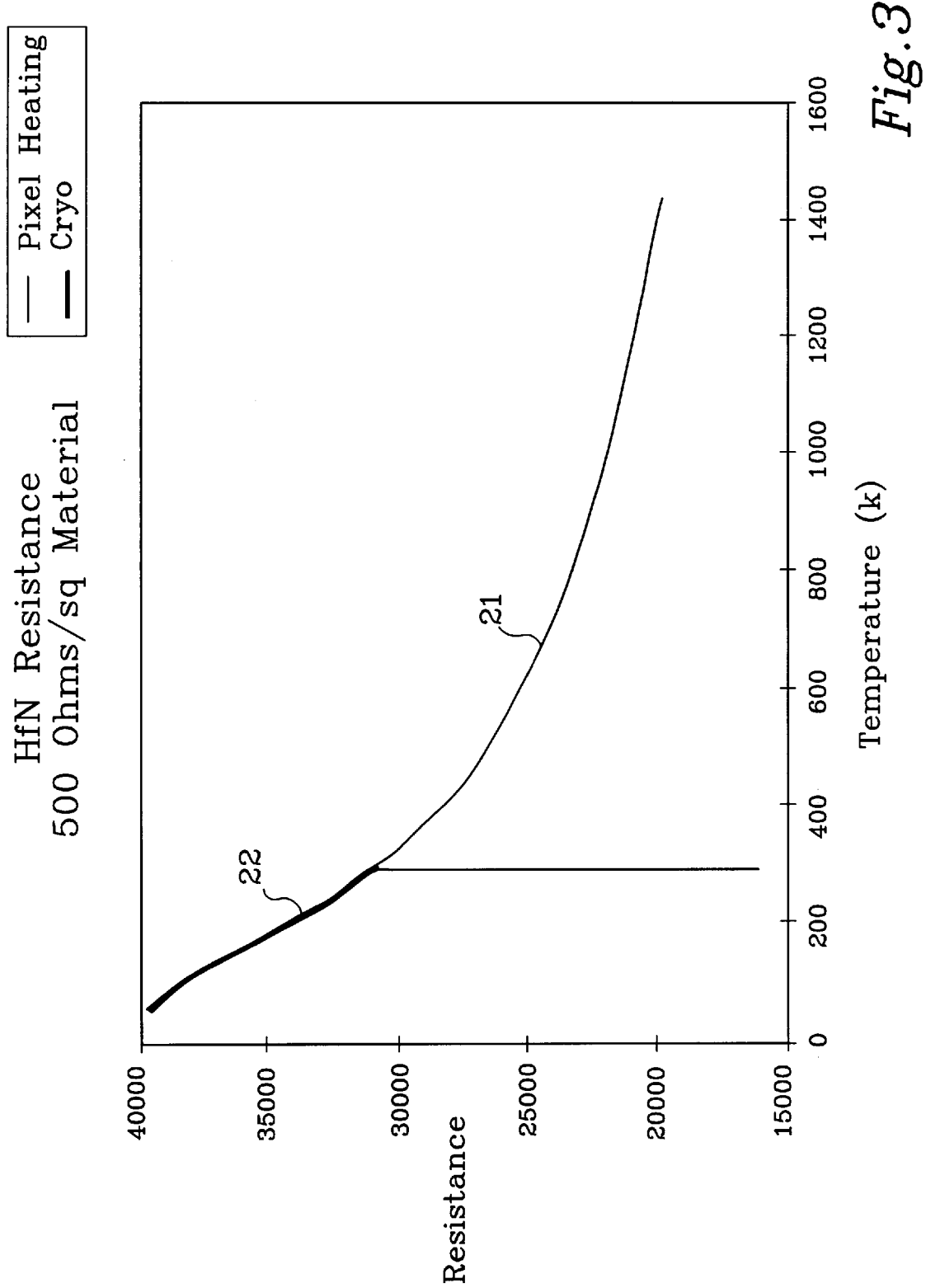
FIG. 3 is a graph showing resistance versus temperature for an HfN RTD.

RTD's 10, 20 and 30 function with high accuracy in sensing temperatures from 20 degrees Kelvin (K) (minus 253 degrees Celsius (C.), minus 423 degrees Fahrenheit (F))

to 1400 degrees K (1130 degrees C., 2066 degrees F.). FIG. 3 is a graph showing the value of resistance of resistor 11 versus temperature in degrees Kelvin. Measurements on HfN resistor 11 have shown that the material can be formed with a resistance from 100 ohms per square to 1,000 kilohms (K-ohms) per square, and be patterned with 100 to 1,000 squares yielding ten K-ohm to one megohm (M-ohm) resistors.

FIG. 3 shows HfN resistor 11 to have a rather uniform resistance over temperature. Thin curve 21 reveals the heat measurements and thick curve 22 reveals the cool measurements. Resistor 11 for FIG. 3 has HfN resistance 500 ohms per square material.

Figure 4:
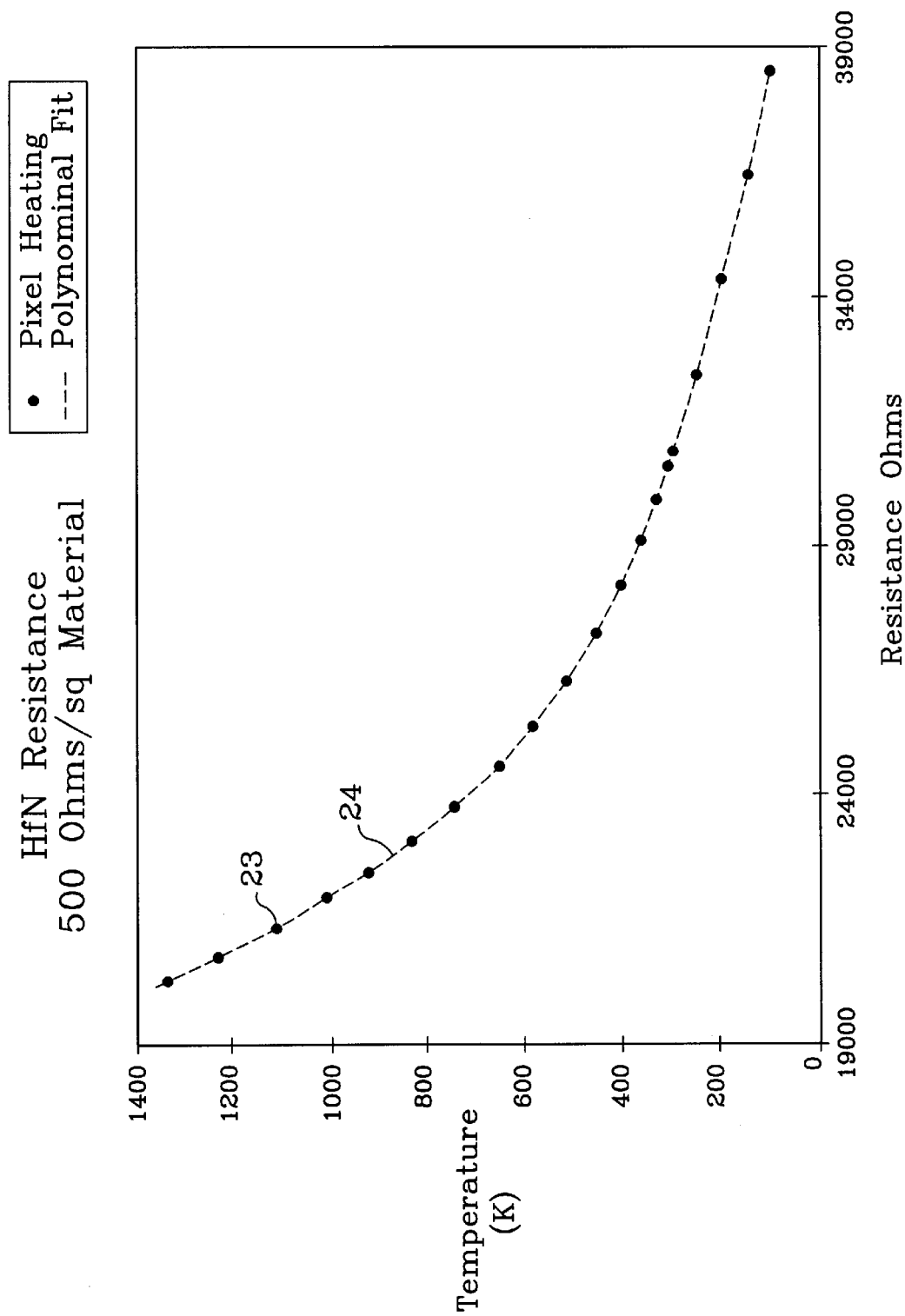
FIG. 4 shows a polynomial fit of resistance versus temperature for the HfN RTD.

FIG. 4 shows a close agreement between plots 23 of temperature at the measured resistance of resistor 11 with temperature calculated from one (fifth-order) polynomial fit 24 to the resistance. The fit is within 0.5 degrees K over the temperature range. Resistor 11 here has HfN resistance of 500 ohms per square material. The uniformity and high value of the resistance of resistor 11 over a large temperature range permits complete use of the present RTD's 10, 20, 30 with only two wires, which reduces complexity, weight and costs in applications.

Figure 5:
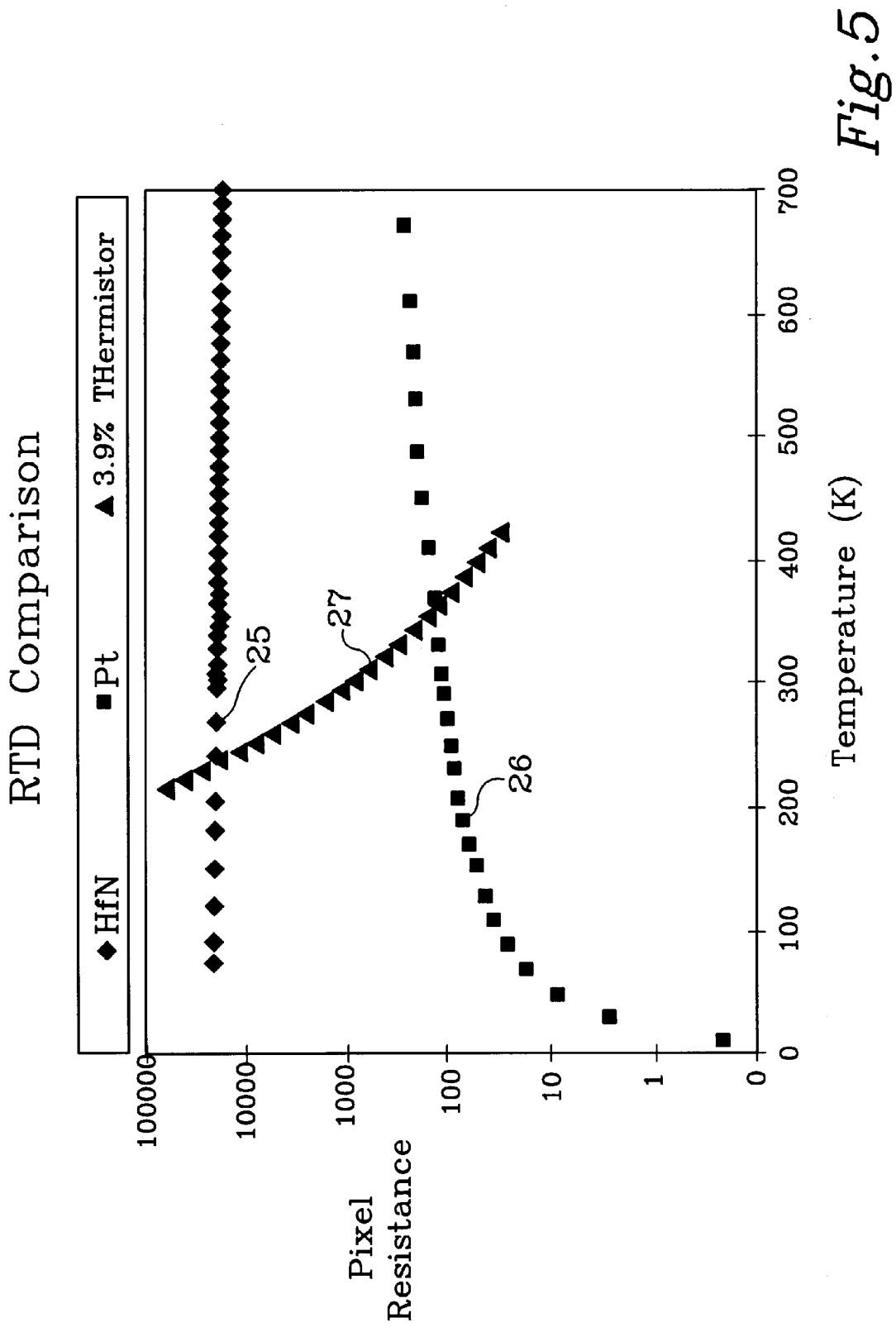
FIG. 5 shows comparison data of resistance versus temperature for an HfN RTD, a Pt RTD and a thermistor.

Related-art RTD's, such as those having resistors made from Pt or like metals, have a low resistance in the range of 100 to 1000 ohms because of the low resistance of the metals. For useful measurements of practical accuracy, such RTD's require three or four point wire measurements or leads which increase complexity, weight and costs in applications. Further, the Pt RTD, for instance, has a different performance profiles at cold and hot temperatures having a TCR ranging from approximately 0.44 at minus 200 degrees C. to 0.29 at 850 degrees C. This performance requires the use of at least two polynomial fits to the Pt RTD output signal over temperature to obtain acceptable temperature measurements over a useful temperature range. FIG. 5 shows a comparison of resistance on a logarithmic scale versus temperature for the present HfN RTD 10, 20, 30, Pt RTD and a 3.9 percent thermistor. Curves 25, 26 and 27 show resistance versus temperature plots for the HfN RTD, Pt RTD and thermistor, respectively.

FIG. 6 shows RTD stability as a result of cold and hot temperature cycling of a passivated HfN resistor 11. Sensor 10 is (400-degree annealed) passivated with only an SiN film. Curve 28 is temperature versus time in hours. Curve 29 is the resistance of resistor 11 versus time. Cycling between 300 degrees C. and zero degrees C. shows a slight resistance drift of sensor 30. There is no resistance drift below zero degree C. The 300 degree C. drift is about 0.003 percent per hour for a 200 hour period. The high temperature drift is reflected in the zero degree C. drift. The hot-to-cold resistance ratios remain unchanged (0.00001 percent per hour) despite drift. Passivating RTD 30 more should result in more stability and a larger temperature range of operation.

Figure 8:
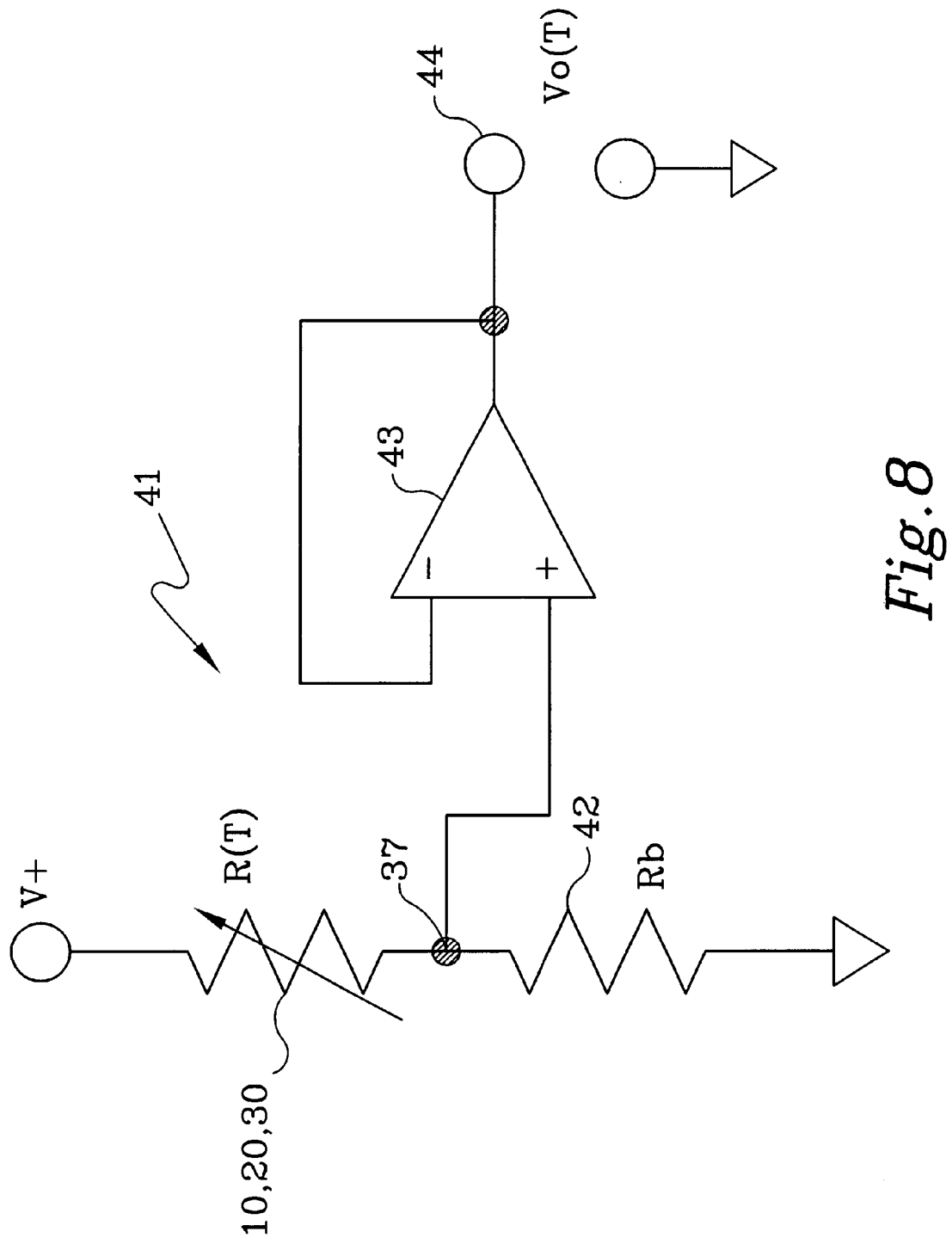
FIG. 8 shows a diagram of interface electronics for an RTD.

FIG. 7 shows RTD 10, 20, 30 connected to processing electronics 38. A temperature indicator 39 is connected to processing electronics 31. FIG. 8 is a schematic revealing an analog buffering interface 41 for the RTD 10, 20, 30 output 37. Output 37 is connected to ground with a bias resistor 42 and to a non-inverting input of an operational amplifier 43. The operational amplifier is connected in a voltage follower configuration with output 44 fed back to the inverting input of operational amplifier 43. Output 44 has a voltage that is an indication of temperature measured by RTD 10, 20, 30. Output 44 may be connected to an analog-to-digital (A/D) converter. The digital output of the converter may go to a digital processor for signal processing or recording in a memory as desired. Interface 41, A/D converter, digital processor and memory are part of processing electronics 38. Also, a digital-to-analog converter, if desired, may be part of electronics 38. Indicator 39 may receive analog or digital signals to provide visual or electronic indications, for various applications, of the temperature measurements from the RTD or other processed information, such as from the memory.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A high temperature resistance temperature device comprising:
    a substrate;
    a resistor made substantially of hafnium nitride (HfN) and formed on said substrate, said resistor having a measurable resistance over a temperature range of from about 30 to about 1400 degrees Kelvin;
    first and second leads forming the sole means of passing current through said resistor; said first and second leads being adapted for connection to processing electronics for determining the temperature of said resistor as a function of the resistance thereof.

2. The resistance temperature device of claim 1, further comprising:
    a first bonding pad, connected to a first end of said HfN resistor, situated on said substrate; and
    a second bonding pad, connected to a second end of said HfN resistor, situated on said substrate.

3. The resistance temperature device of claim 2, further comprising a passivation layer formed on said HfN resistor.

4. The resistance temperature device of claim 3, further comprising:
    a first lead connected to said first bonding pad; and
    a second lead connected to said second bonding pad.

5. The resistance temperature device of claim 4, wherein said substrate is fabricated from a material selected form a group consisting of alumina, glass, silicon and ceramic.

6. The resistance temperature device of claim 5, further comprising:
    processing electronics connected to said first and second leads: and
    an indicator connected to said processing electronics.

7. The resistance temperature device of claim 6, wherein said indicator is a temperature indicator.

8. The resistance temperature device of claim 7, wherein temperature of said HfN resistor versus resistance fits a fifth order polynomial.

9. The resistance temperature device of claim 7, wherein temperature of said HfN resistor versus resistance fits a third order polynomial.

10. The resistance temperature device of claim 5, wherein said HfN resistor is a trimmable precision resistor.

11. The resistance temperature device of claim 10, wherein said HfN resistor has a serpentine configuration.

12. A high temperature resistance temperature device comprising:
    a die;
    a strip made substantially of hafnium nitride (HfN) and formed on said die, said strip having a measurable resistance over a temperature range of from about 30 to about 1400 degrees Kelvin;

a first bonding pad connected to a first end of said HfN strip;

a second bonding pad connected to a second end of said HfN strip;

first and second leads connected to said first and second bonding pads respectively, said leads forming the sole means of passing current through said strip; said first and second leads being adapted for connection to processing electronics for determining the temperature of said resistor as a function of the resistance thereof.

13. The resistance temperature device of claim 12, further comprising a passivation-layer formed on said HfN strip.

14. The resistance temperature device of claim 13, wherein:

said HfN strip is a thin film; and said passivation layer is a thin film.

15. The resistance temperature device of claim 14, further comprising:

a substrate upon which said die is situated;

a first contact strip formed on said substrate;

a second contact strip formed on said substrate;

a first wire connected to said first lead and to said first contact strip; and a second wire connected to said second lead and to said second contact strip.

16. The resistance temperature device of claim 15, wherein said HfN strip is a trimmable precision resistor.

17. The resistance temperature device of claim 15, further comprising an HfN resistor connected in series with said HfN strip, wherein said HfN resistor is trimmable ladder resistor.

18. The resistance temperature device of claim 15, wherein said HfN strip has a serpentine configuration.

19. The resistance temperature device of claim 18, further comprising:

a first lead connected to said first contact strip; and a second lead connected to said second contact strip.

20. A high temperature resistance temperature device comprising:

a substrate;

a thin film resistor made substantially of hafnium nitride (HfN) and formed on said substrate, said resistor having a measurable resistance over a temperature range of from about 30 to about 1400 degrees Kelvin;

a first thin film contact strip connected to said thin film HfN resistor at a first location;

a second thin film contact strip connected to said thin film HfN resistor at a second location; and first and second leads connected to said first and second thin film contact strips respectively, said leads forming the sole means of passing current through said resistor; said first and second leads being adapted for connection to processing electronics for determining the temperature of said resistor as a function of the resistance thereof.

21. The resistance temperature device of claim 20, further comprising a thin film passivation layer formed on said then film HfN resistor.

22. The resistance temperature device of claim 21, further comprising processing electronics connected to said first and second thin film contact strips.

* * * * *